United States Patent
Yamasaki

(10) Patent No.: US 9,875,772 B2
(45) Date of Patent: Jan. 23, 2018

(54) EDITING APPARATUS AND EDITING METHOD

(75) Inventor: Naoya Yamasaki, Kobe (JP)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 381 days.

(21) Appl. No.: 12/450,797

(22) PCT Filed: Mar. 13, 2008

(86) PCT No.: PCT/JP2008/000567
§ 371 (c)(1),
(2), (4) Date: Oct. 13, 2009

(87) PCT Pub. No.: WO2008/129782
PCT Pub. Date: Oct. 30, 2008

(65) Prior Publication Data
US 2010/0119204 A1 May 13, 2010

(30) Foreign Application Priority Data

Apr. 13, 2007 (JP) .................................. 2007-106499

(51) Int. Cl.
*H04N 9/80* (2006.01)
*G06F 3/00* (2006.01)
(Continued)

(52) U.S. Cl.
CPC ........ *G11B 27/034* (2013.01); *G06K 9/00765* (2013.01); *G11B 15/1875* (2013.01); *G06F 12/00* (2013.01)

(58) Field of Classification Search
CPC ................................ G11B 27/034; H04N 9/80

USPC ..... 386/278, 280, E5.028, E5.051, 344, 243, 386/248, 281, 318, 326, 241, 282, 283, 386/284, 328; 348/E5.051; 360/13, 7; 715/723, 835; 345/547, 552; 711/161, 711/173; 713/1, 2, 100; 717/140

See application file for complete search history.

(56) References Cited

U.S. PATENT DOCUMENTS 5,526,132 A * 6/1996 Tsubota et al. ................ 386/280
5,760,767 A 6/1998 Shore et al.
(Continued)

FOREIGN PATENT DOCUMENTS

EP 0801391 A2 * 10/1997 ........... G11B 27/034
JP 2001-285780 A 10/2001
(Continued)

OTHER PUBLICATIONS

Search Report dated Aug. 4, 2008.
(Continued)

*Primary Examiner* — Thai Tran
*Assistant Examiner* — Syed Hasan
(74) *Attorney, Agent, or Firm* — Arent Fox LLP

(57) ABSTRACT

An editing apparatus for a editing video sequence, comprises: an editing unit for setting a first range to one part of the video sequence; a video sequence file generating unit for generating a video sequence file including video sequence corresponding to the first range and video sequence corresponding to a second range, wherein the second range is consecutively preceding to and/or subsequent to the first range; and an output for outputting the video sequence file.

40 Claims, 14 Drawing Sheets

(51) Int. Cl.
  *G06F 13/00* (2006.01)
  *G11B 27/00* (2006.01)
  *G11B 27/034* (2006.01)
  *G11B 15/18* (2006.01)
  *G06K 9/00* (2006.01)
  *G06F 12/00* (2006.01)

(56) References Cited

U.S. PATENT DOCUMENTS

| | | | |
|---|---|---|---|
| 6,034,679 A * | 3/2000 | McGrath | 715/723 |
| 6,134,380 A | 10/2000 | Kushizaki | |
| 6,236,802 B1 * | 5/2001 | Yamamoto | G11B 27/002 386/241 |
| 6,661,965 B2 | 12/2003 | Yamamoto | |
| 6,681,325 B1 * | 1/2004 | Marsh et al. | 713/2 |
| 7,593,619 B2 * | 9/2009 | Yamasaki | 386/248 |
| 7,738,769 B2 * | 6/2010 | Ishii | 386/243 |
| 7,804,505 B2 * | 9/2010 | Watanabe et al. | 345/547 |
| 2001/0012437 A1 | 8/2001 | Yamamoto | |
| 2005/0201724 A1 * | 9/2005 | Chu | 386/68 |
| 2005/0271358 A1 * | 12/2005 | Inata | G11B 27/031 386/232 |
| 2006/0242632 A1 * | 10/2006 | Orsolini et al. | 717/140 |
| 2008/0022205 A1 * | 1/2008 | Shinkai et al. | 715/723 |

FOREIGN PATENT DOCUMENTS

| | | |
|---|---|---|
| JP | 2001285780 A | 10/2001 |
| JP | 2005-064823 A | 3/2005 |
| JP | 2005064823 A | 3/2005 |
| JP | 2008-027492 A | 2/2008 |
| JP | 2008027492 A | 2/2008 |

OTHER PUBLICATIONS

Office Action for Japanese patent application No. 2009-544074 issued by the Japanese Patent Office dated Nov. 27, 2012.
The Avid Handbook, titled "Intermediate Techniques, Strategies, and Survival Information for Avid Editing Systems" Fourth Edition, by Steve Bayes.
English Translation of First Office Action regarding Chinese Patent Application No. CN200880020206.3.
English Translation of Second Office Action regarding Chinese Patent Application No. CN200880020206.3.
English Translation of Third Office Action regarding Chinese Patent Application No. CN200880020206.3.
Notice of Decision of Final Rejection dated Apr. 2, 2013 regarding Japanese Patent Application No. JP2009-544074.
Examination Report dated Jun. 15, 2011 received from European Patent Office regarding Application No. EP08720453.3.
IPRP dated Oct. 13, 2009 with Written Opinion regarding PCT Patent Application No. PCT/JP2008/000567.
PCT Publication No. WO2008/129782 dated Oct. 30, 2008 regarding PCT Application No. PCT/JP2008/000567.
Notice of Reasons for Refusal dated Nov. 27, 2012 regarding Patent Application No. JP2009-544074.
Inquiry dated Dec. 10, 2013 regarding Japan Application No. JP2009-544074.
Inquiry dated Dec. 10, 2013 regarding Japan Application No. JP2009-544074, and English translation of Analysis of Dec. 10, 2013 Inquiry.
Summons to Attend Oral Proceedings dated Feb. 18, 2015, regarding EP08720453.3.

* cited by examiner

EDITING APPARATUS AND EDITING METHOD

CROSS REFERENCE TO RELATED APPLICATIONS

This application claims the benefit, under 35 U.S.C. §365 of International Application PCT/JP2008/000567, filed Mar. 13, 2008, which was published in accordance with PCT Article 21(2) on Oct. 30, 2008 in English and which claims the benefit of Japanese patent application No. 2007-106499, filed Apr. 13, 2007.

TECHNICAL FIELD

The present invention relates to an apparatus for and a method of editing video sequence.

BACKGROUND ART

There is a variety of applications that perform, for example, image and audio editing by using various video sequence, such as moving picture data, static image data, audio data, and text data, in response to editing information that is received from a user; in addition, such applications are provided as software that functions on a personal computer, a workstation, and other information processing apparatuses.

Each of these applications is configured so that it generates a sequence of video and audio data by executing an editing process that reads all or part of the various video sequence, such as image data and audio data stored in a storage medium, and splices desired portions thereof together.

With such an editing application, the editing target is handled as multiple clips, each of which references video sequence in a predetermined temporal range, e.g., the editing application can be configured so that the clips are disposed on multiple tracks along a time axis after which an editing process is performed that corresponds to editing information received from the user.

It is conceivable to export an editing data file, wherein editing information is described, so that a clip that is being edited by one application can be used by a different application. To make the editing data file that can be used by all applications, it should be recorded with a standardized description format, e.g., AAF (Advance Authoring Format), XML (Extensible Markup Language), EDL (Edit Decision List), or some other format.

Patent Citation 1: Japanese Published Unexamined Patent Application No. 2004-310889

DISCLOSURE OF INVENTION

Technical Problem

If applications that exchange data are installed on the same computer system or are capable of referencing the same video sequence via a network, then the applications may export an editing data file only.

However, if the application that uses the exported editing data file cannot reference the original video sequence, then the video sequence file referred by the clip must be exported along with the editing data file.

There is a problem in that, if the original video sequence are copied and output as is as the video sequence file to be exported, then quantity of excess data increases. Consequently, it is conceivable to copy only a reference range that is referred by the clip from the original video sequence, to generate a video sequence file, and to export such.

There is a problem in that, if only the video sequence of the reference range that is referred by the clip is exported as a data file, then the application that uses that data file cannot perform trimming, wherein the reference range referred by the clip is expanded before a start point or after an end point thereof.

It is an object of the present invention to provide a novel and useful editing apparatus and editing method. It is yet another object of the present invention to provide an editing apparatus and an editing method wherein, when an editing apparatus exports a file including video sequence, it generates a file that can improve flexibility in editing the video sequence at the export destination.

Technical Solution

A first aspect of the invention provides an editing apparatus for editing a video sequence, comprising: an editing unit for setting a first range to one part of the video sequence; a video sequence file generating unit for generating a video sequence file including video sequence corresponding to the first range and video sequence corresponding to a second range, wherein the second range is consecutively preceding to and/or subsequent to the first range; and an output for outputting the video sequence file.

According to the present invention, if outputted video sequence file is edited by another editing apparatus or by software, then it is possible to edit not only video sequence in the first range, but also video sequence in the second range, which is consecutively preceding to and/or subsequent to the first range, which makes it possible to expand the editable range and to improve the flexibility of editing. In addition, in the conventional case, when it is necessary to edit video sequence that is before or after the first range, the editing apparatus must reset and once again output the first range; however, according to the present invention, video sequence of the second range that is consecutively preceding to and/or subsequent to the first range is included in the video sequence file, and therefore that troublesome procedure can be omitted.

A second aspect of the invention provides an editing method for editing a video sequence, comprising steps of: setting a first range to one part of the video sequence; generating a video sequence file, including the video sequence corresponding to the first range and video sequence corresponding to a second range consecutively preceding to and/or subsequent to the first range; and outputting the video sequence file.

According to the present invention, if outputted video sequence file is edited by another editing method or by software, then it is possible to edit not only video sequence in the first range, but also video sequence in the second range, which is consecutively preceding to and/or subsequent to the first range, which makes it possible to expand the editable range and to improve the flexibility of editing. In addition, in the conventional case, when it is necessary to edit video sequence that is before or after the first range, the editing apparatus must reset and once again output the first range; however, according to the present invention, video sequence of the second range that is consecutively preceding to and/or subsequent to the first range is included in the video sequence file, and therefore that troublesome procedure can be omitted.

Advantageous Effect

The present invention can provide an editing apparatus and an editing method wherein, when an editing apparatus exports a file including video sequence, it generates a file that can improve flexibility in editing the video sequence at the export destination.

EXPLANATION OF REFERENCE

Figure 1:
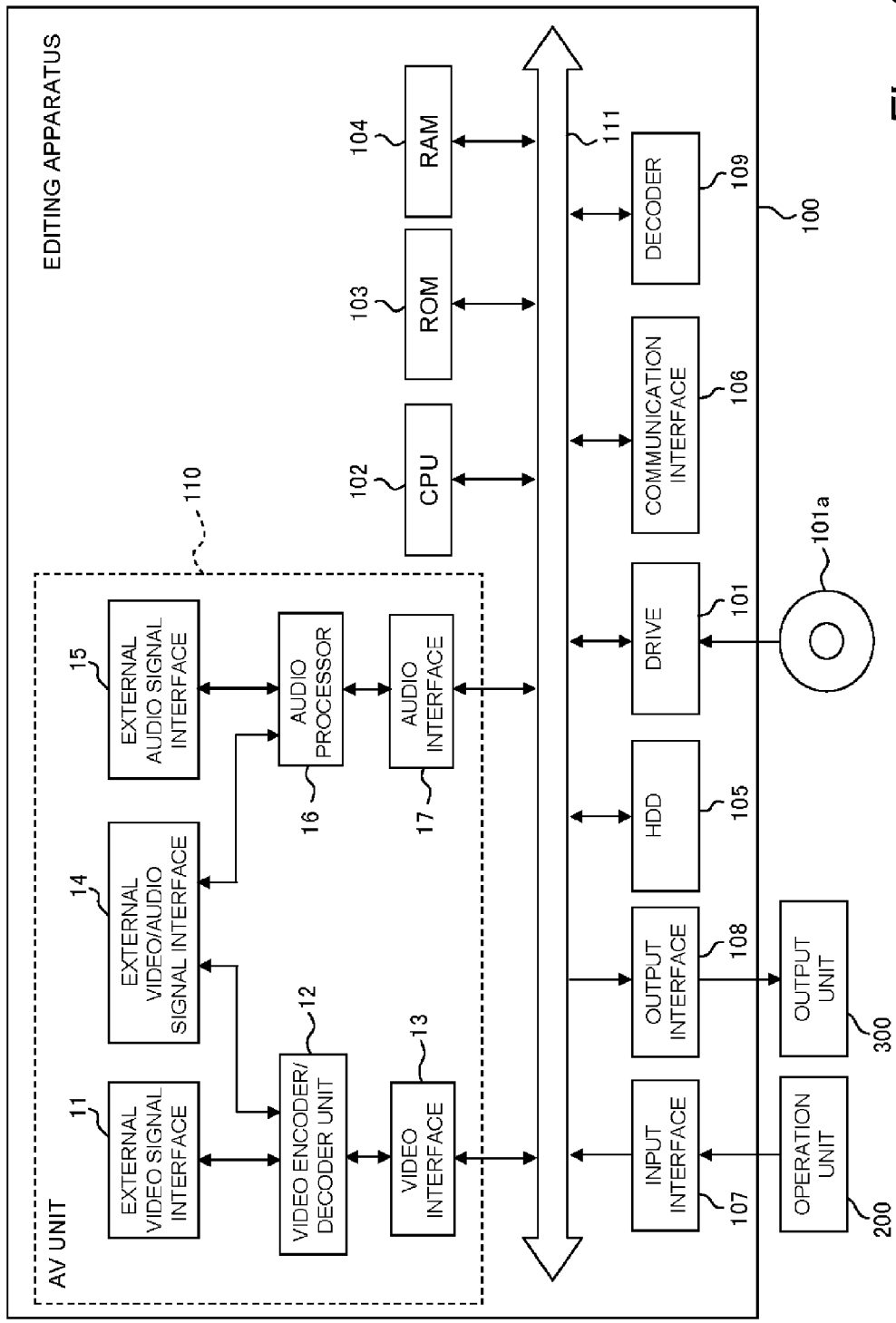
FIG. 1 is a block diagram that shows a schematic configuration of an editing apparatus according to one embodiment of the present invention.

22 Instruction accepting unit
24 Editing unit
25 Information input unit
26 Editing data file unit
27 Video sequence file generating unit
28 Information output unit
100 Editing apparatus

BEST MODE FOR CARRYING OUT THE INVENTION

<Overview of the Invention>

An editing apparatus that integrates video sequence, such as moving picture data, static image data, audio data, and text data, and edits moving picture data, audio data, and the like can be implemented by using a so-called personal computer terminal, e.g., a desktop computer or a laptop computer. In accordance with a user's editing instruction, the editing apparatus references video sequence, which is stored in a built-in or externally connected storage medium or in data storage that resides on a network, and selects a clip that comprises time length information.

Editing data are generated by associating a clip ID with a video sequence reference range referred by the clip and a time axis time position of the video sequence generated by editing.

The editing apparatus manages the editing data of the clip that references part or all of the video sequence. Sometimes, video sequence referred by a clip and the editing data thereof are called a project collectively. Furthermore, a project does not necessarily need to contain editing data.

When video sequence are exported for another application's use, the editing apparatus generates a video sequence file including video sequence, wherein a range referred by the clip is cut from the original video sequence as needed.

In addition, the editing apparatus outputs an editing data file including the video sequence file along with editing data. The editing apparatus may output a file wherein the video sequence file and the editing data file are integrated, i.e., a file including the video sequence and the corresponding editing data. Sometimes, such an integrated file is called a project file.

Editing information is called project information, and editing data contained in this project information are output as an editing data file that is described in, for example, AAF, XML, EDL, or some other format.

The editing data file contains, for example, clip information, project information, track information, head position information, and time length information. The editing data file is configured so that it contains position and length information about the video sequence (of all the video sequence being edited) that are referred by the clip, and associates the entirety of the video sequence with the video sequence that are referred by the clip.

If the video sequence file cut from the original material data is incorporated in the project information, then it is generated by adding prescribed supplementary ranges to the reference range referred by the clip so that they are consecutively preceding to and/or subsequent to the reference range.

<Hardware Configuration of the Editing Apparatus>

FIG. 1 is a block diagram that shows the hardware configuration of the editing apparatus according to one embodiment of the present invention.

Referring to FIG. 1, an editing apparatus 100 comprises a drive 101 for driving an optical disc or some other storage medium, a CPU 102, RAM 104, ROM 103, an HDD 105, a communication interface 106, an input interface 107, an output interface 108, decoder 109 and a bus 111 that connects them all.

A removable medium 101a, such as an optical disc, is mounted to the drive 101, and data are read out from the removable medium 101a. FIG. 1 shows a case wherein the drive 101 is built into the editing apparatus 100, but the drive 101 may be an external drive. The drive 101 can use, for example, an optical disc as well as a magnetic disk, a magneto-optic disk, a Blu-ray disc, or semiconductor memory. The read out of video sequence may be performed by a resource on the network to which a connection can be made via the communication interface 106.

The CPU 102 loads a control program stored in the ROM 103 to a volatile storage area in, for example, the RAM 104, and controls the operation of the entire editing apparatus 100 based thereon.

The HDD 105 stores an application program, which serves as the editing apparatus. The CPU 102 loads the application program to the RAM 104 and causes the computer to function as the editing apparatus. In addition, a configuration is possible wherein the HDD 105 stores, for example, the video sequence read out from the removable media, e.g., an optical disc, and the editing data of each clip. Because the speed of access to the video sequence stored in the HDD 105 is faster comparatively than that to an optical disc mounted to a disk drive, using video sequence stored on the HDD 105 during editing reduces display delay. As long as the storing means of the editing data is capable of high speed access, it is not limited to the HDD 105, e.g., it is possible to use a magnetic disk, a magneto-optic disk, a Blu-ray disc, or semiconductor memory. In addition, as the editing data storing means, it is possible to use storing means of these types in a network wherein a connection can be made to the storing means via the communication interface 106.

The communication interface 106 communicates with a video camera, which is connected via, for example, a USB (Universal Serial Bus), and receives data recorded on a storage medium in the video camera. In addition, the communication interface 106 is capable of transmitting generated editing data to a resource on the network via a LAN, the Internet, or the like.

The input interface 107 receives an instruction, which is input by the user via an operation unit 200 such as a keyboard or a mouse, and supplies an operation signal to the CPU 102 via the bus 111.

The output interface 108 supplies image data, audio data, and the like from the CPU 102 to an output apparatus 300, such as a speaker or a display apparatus, e.g., an LCD (liquid crystal display device) or CRT.

An AV unit 110 also executes various processes on a video signal and an audio signal, and comprises the following elements and functions.

An external video signal interface 11 transfers the video signal between the editing apparatus 100 and an external video encoder/decoder unit 12. For example, the external video signal interface 11 is provided with an input-output unit for an analog composite signal and analog component signals.

The video encoder/decoder unit 12 decodes and performs analog conversion on the video data supplied via a video interface 13, and outputs the obtained video signal to the external video signal interface 11. In addition, the video encoder/decoder unit 12 performs digital conversion on the video signal supplied from, for example, the external video signal interface 11 or an external video and audio signal interface 14 as needed; subsequently, for example, the video encoder/decoder unit 12 encodes the digital data in the MPEG-2 format and outputs the obtained data to the bus 111 via the video interface 13.

The video interface 13 transfers data between the video encoder/decoder unit 12 and the bus 111.

The external video and audio signal interface 14 outputs video data and audio data, which are input from external equipment, to the video encoder/decoder unit 12 and an audio processor 16, respectively. In addition, the external video and audio signal interface 14 externally outputs the video data supplied from the video encoder/decoder unit 12 and the audio data supplied from the audio processor 16. For example, the external video and audio signal interface 14 is an SDI (Serial Digital Interface) compliant interface.

An external audio signal interface 15 transfers the audio signal between external equipment and the audio processor 16. For example, the external audio signal interface 15 is an analog audio signal standard compliant interface.

The audio processor 16 performs analog/digital conversion on the audio signal supplied from the external audio signal interface 15 and outputs the obtained data to an audio interface 17. In addition, the audio processor 16 performs digital-analog conversion and audio adjustment on the audio data supplied from the audio interface 17 and outputs the obtained signal to the external audio signal interface 15.

The audio interface 17 supplies data to the audio processor 16 and outputs data from the audio processor 16 to the bus 111.

<Functional Configuration of the Editing Apparatus>

Figure 2:
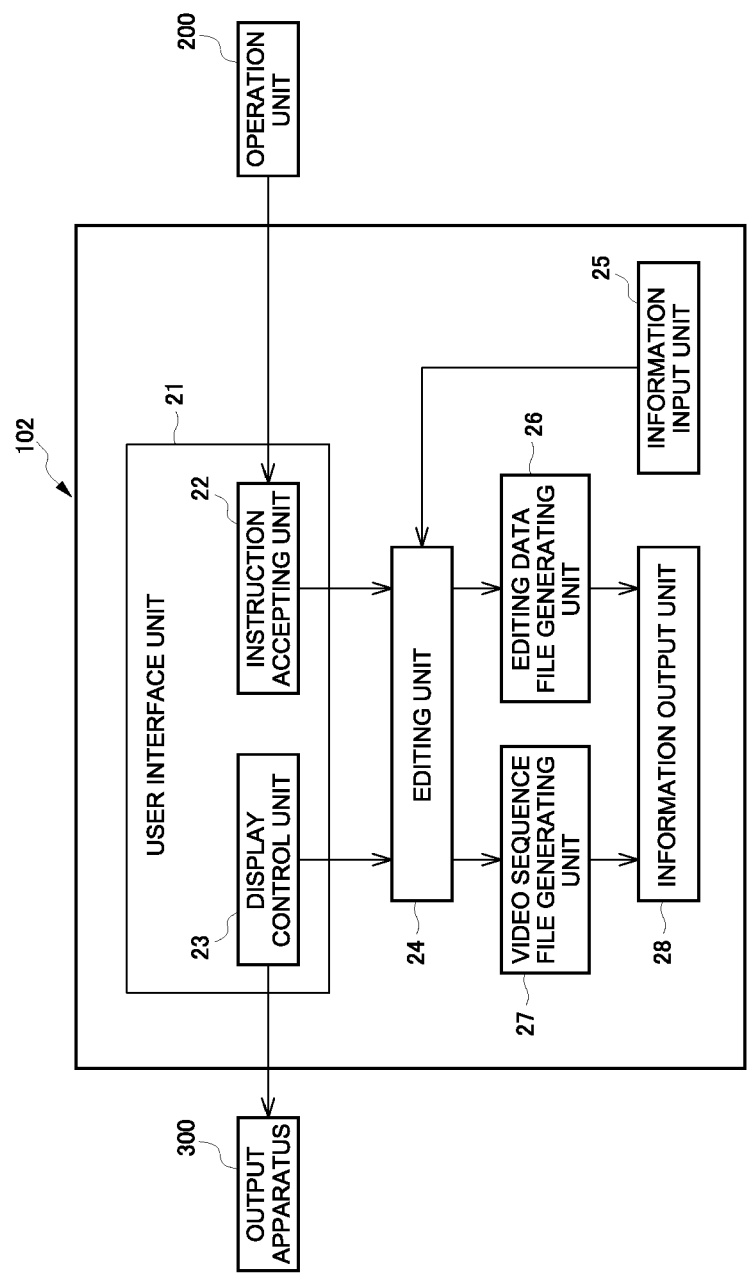
FIG. 2 is a functional block diagram of the editing apparatus according to one embodiment of the present invention.

FIG. 2 is a block diagram that shows the functional configuration of the editing apparatus 100. Referring to FIG. 2, the CPU 102 of the editing apparatus 100 comprises various functional blocks, e.g., a user interface unit 21, an editing unit 24, an information input unit 25, an editing data file generating unit 26, a video sequence file generating unit 27, and an information output unit 28, all of which are implemented by an application program that is loaded to memory 104.

The various functional blocks described above implement an import function that inputs a project file containing video sequence, editing data, or the like, an editing function, which edits the clips, an export function, which exports the project file that contains the video sequence and/or the editing data, and a margin setting function, which sets the margins of the video sequence when the project file is exported.

<Editing Function>

Figure 3:
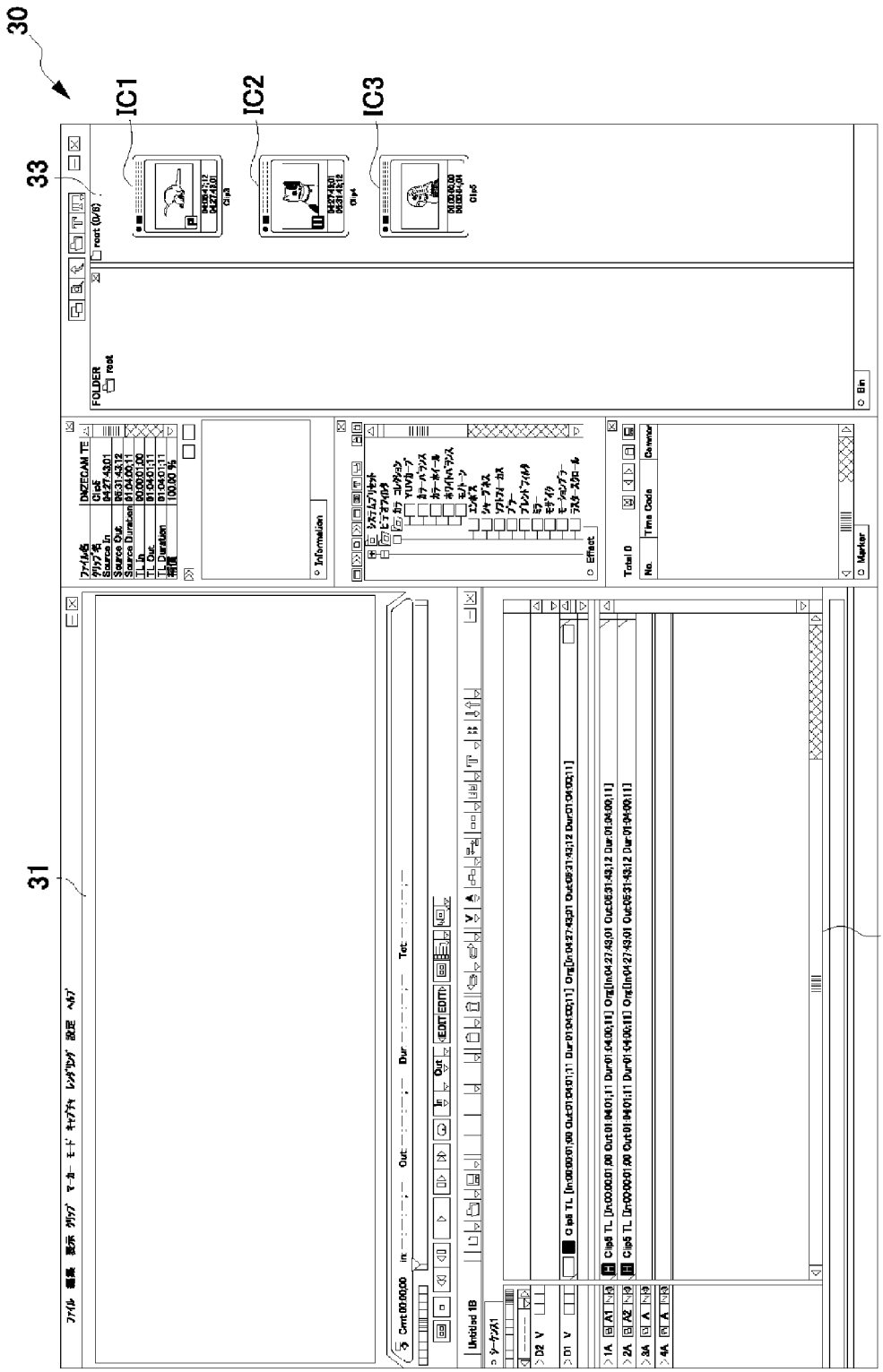
FIG. 3 is an explanatory diagram that shows one example of an editing screen generated by the editing apparatus according to one embodiment of the present invention.

FIG. 3 shows one example of an editing screen of the editing apparatus 100.

Referring to FIG. 3 along with FIG. 2, display data on the editing screen are generated by a display control unit 23, and then output to a display of the output apparatus 300.

The editing screen 30 comprises: a playback window 31, which displays a playback screen for edited content, acquired video sequence, and the like; a timeline window 32 that comprises multiple tracks, wherein clips are disposed along a timeline; and a video sequence window 33 (such as a Bin window) that displays the acquired video sequence as icons.

The user interface unit 21 comprises an instruction accepting unit 22 that accepts instruction input that is input by the user via the operation unit 200, and the display control unit 23 that performs display control with respect to the output apparatus 300, which is, for example, a monitor or a speaker.

The editing unit 24 acquires video sequence referred by a clip, which comprises the video sequence referred by the clip that is specified by an instruction input by the user via the operation unit 200 or comprises project information that is specified by default, via an information input unit 25.

If material data stored on the HDD 105 are specified, then the information input unit 25 displays such in the video sequence window 33; if video sequence that are not recorded on the HDD 105 are specified, then the information input unit 25 reads out the video sequence from, for example, a resource on the network or a removable medium, and displays such as an icon in the video sequence window 33. This example three icons IC1-IC3 are displayed, each of which represents video sequence.

On the editing screen, the instruction accepting unit 22 accepts the instruction of a clip that is used in editing, a reference range of the video sequence, and a time position that the reference range occupies on the time axis of the content. Specifically, the instruction accepting unit 22 accepts instructions, such as the clip ID, a start point and a time length of the reference range, and time information about the content wherein the clip is disposed. To achieve this, the user performs an operation in which he or she grabs the displayed clip name and then drags and drops the icon of the desired video sequence onto the timeline. By this operation, the instruction accepting unit 22 accepts the instructions of the clip ID, after which the selected clip is disposed on the track with a time length that is in accordance with the reference range that is referred by the clip.

The start point, the end point, the temporal position on the timeline, and the like of the clip that is disposed on each track can be modified appropriately; for example, it is possible to input an instruction by moving a mouse cursor that is displayed on the editing screen and performing a prescribed operation.

<Project Export Function>

If video sequence containing at least one clip are used by another application, then the video sequence generating unit 27 generates a video sequence file and outputs such via the information output unit 28.

In addition, an editing data file, wherein the editing data that correspond to the video sequence are described in a format that can be used by that application, is generated and output via the information output unit 28. The editing data file can use a format that can be used in common among applications. That format is, for example, AAF, XML, EDL, or some other format.

Figure 4:
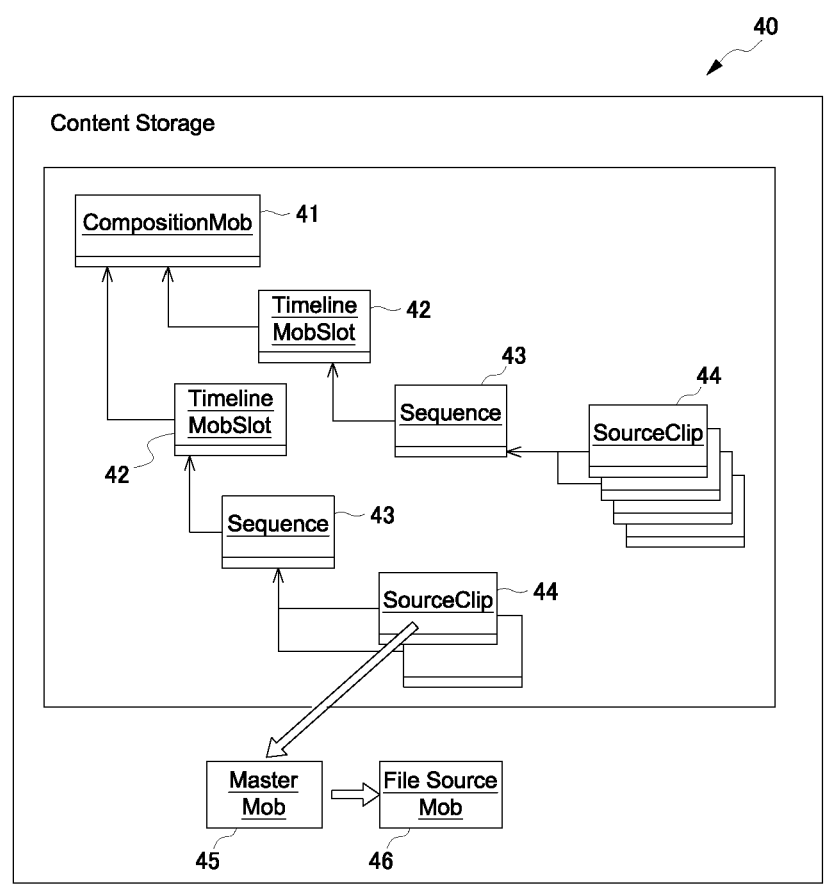
FIG. 4 is an explanatory diagram that shows a data scheme in AAF format.

FIG. 4 shows the structure of the editing information for each clip contained in the editing data file in AAF format.

Referring to FIG. 4 along with FIG. 2, an editing data file 40 comprises: a CompositionMob 41, which indicates a sequence name; a TimelineMobSlot 42, which indicates a track name, an editing unit (frame rate/sample rate), and an attribute (video/audio); a Sequence 43, which indicates the time length and an attribute; a SourceClip 44, which indicates the head position in the video sequence and the length; a MasterMob 45, which indicates the clip name; and a FileSourceMob 46, which indicates the storage location of the video sequence referred by the clip.

If an instruction is given to export the project, then the editing data file generating unit 26 collects the editing data for the video sequence that are being edited by the editing unit 24 and generates the editing data file 40, which is described in a prescribed data format.

The video sequence file generating unit 27 cuts the video sequence from the original video sequence so that the video sequence includes supplementary ranges of prescribed lengths and the reference range. The supplementary ranges are consecutively preceding to and/or subsequent to the reference range referred by the clip. The video sequence file generating unit 27 outputs the video sequence file.

Based on each clip contained in the video sequence being edited by the editing unit 24, the video sequence file includes video sequence generated by the video sequence file generating unit 27 from a prescribed resource.

The margin quantity of the supplementary ranges added to the material data file is specified by the user. In addition, it is possible to set the margin quantity to a default value in accordance with, for example, an attribute of the data or the time length of the reference range referred by the clip.

Figure 5:
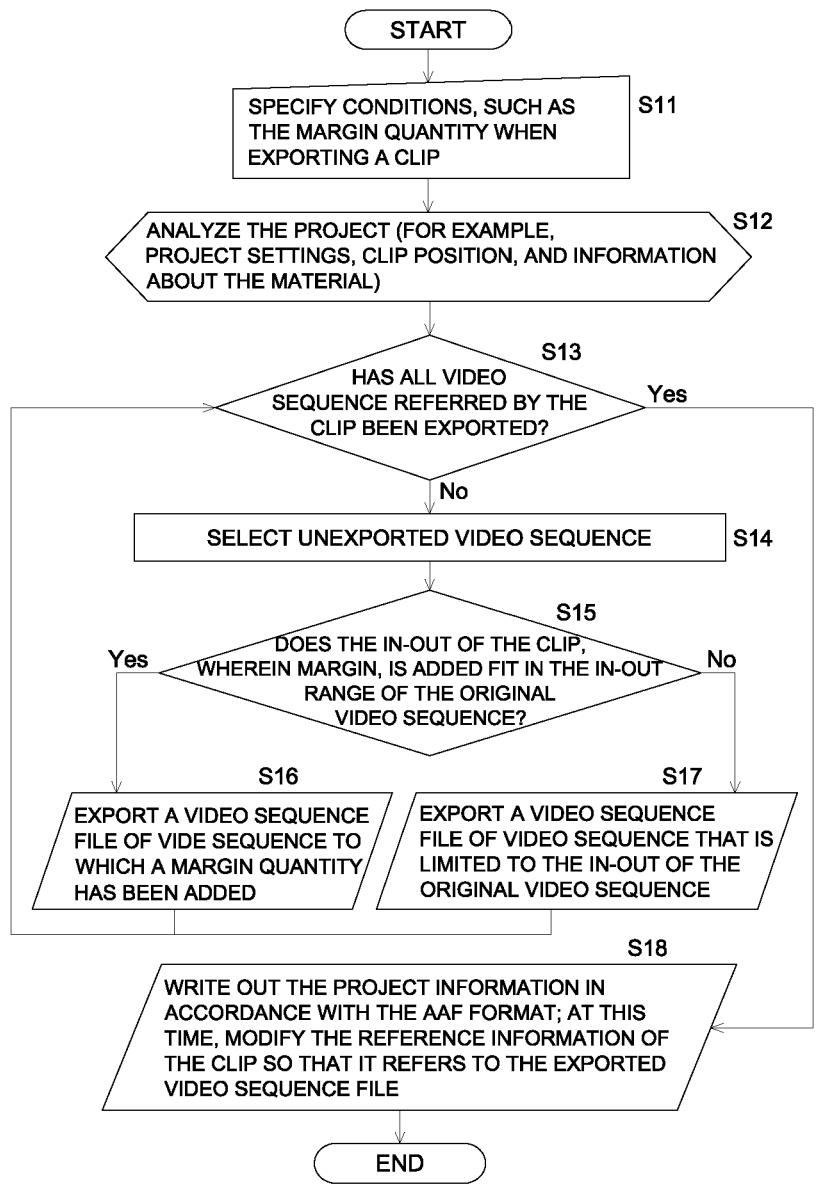
FIG. 5 is a control flow chart of the editing apparatus according to one embodiment of the present invention.
Figure 6:
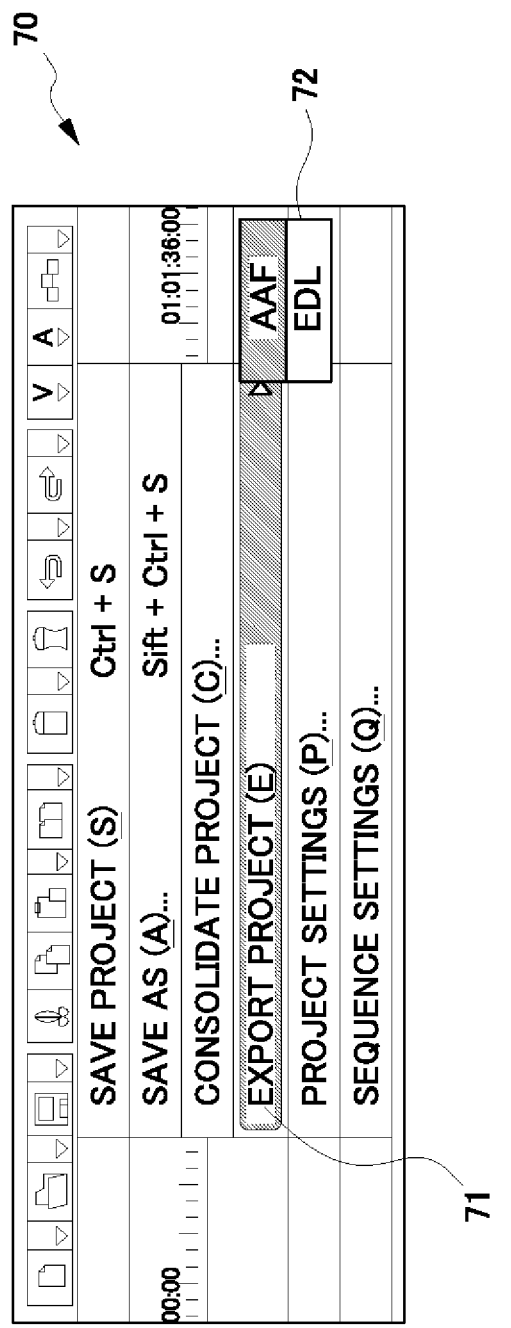
FIG. 6 is an explanatory diagram that shows one example of a processing screen of a project.
Figure 7:
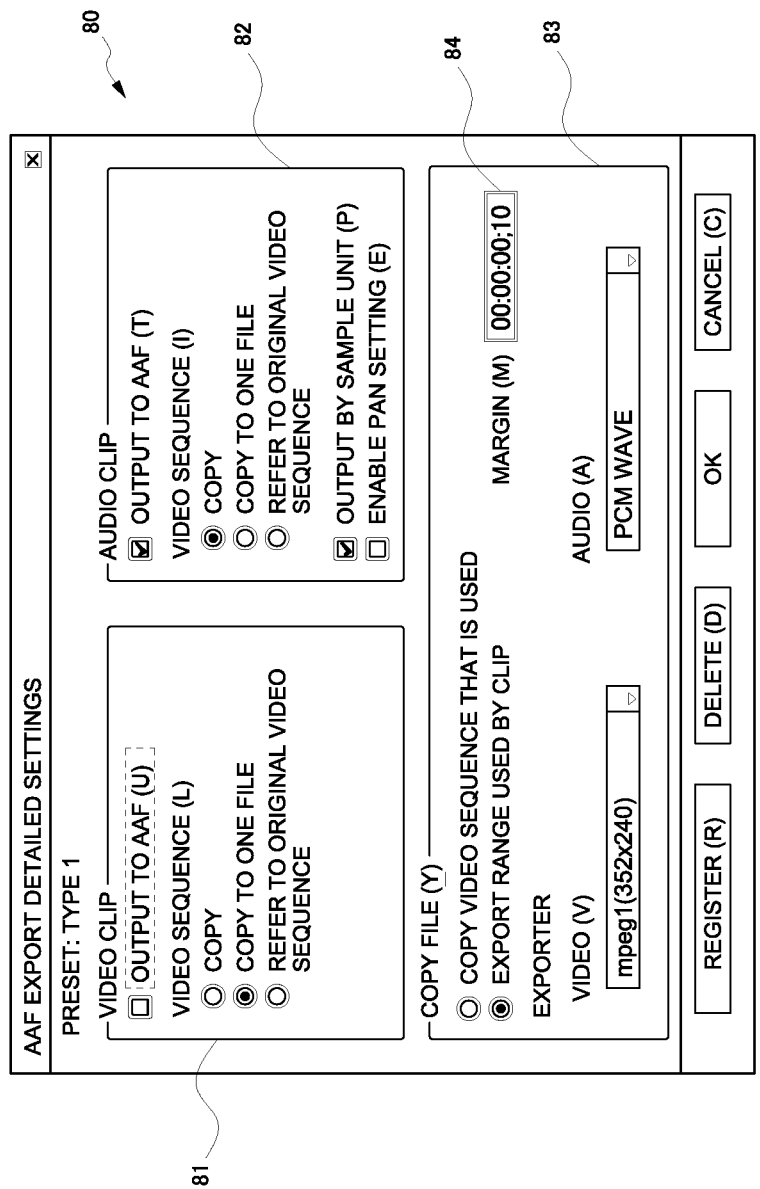
FIG. 7 is an explanatory diagram that shows one example of a detailed settings screen during export.

FIG. 5 is a control flow chart of the editing apparatus according to the present embodiment. FIG. 6 is an explanatory diagram that shows one example of a processing screen for a project. FIG. 7 is a view that shows one example of a detailed settings screen when exporting in the AAF format. Appropriately referring to FIG. 6 and FIG. 7, the procedure of specifying the margin quantity that is added to the material data file by the user will now be explained based on the flow chart in FIG. 5. This example will explain a case wherein the margins for each clip are batch set.

In step S11, the CPU 102 accepts the instruction of a condition, such as the margin quantity when exporting a clip.

Specifically, if the CPU 102 accepts an instruction that is related to the processing of a project, it displays a project processing screen 70, which is shown in FIG. 6. In the project processing screen 70, a menu is displayed that is related to saving and exporting a project and, if an export bar 71 of a project is selected, then a menu window 72 is displayed that receives the format selection of the project editing data file to be exported. In the example shown in FIG. 6, the menu window 72 is configured so that AAF and EDL can be selected, but the present invention is not limited thereto.

If the format of the editing data file is specified, then an export detailed settings screen is displayed in accordance with that format, and instructions for the various detailed settings are received. For example, a detailed settings screen 80 as shown in FIG. 7 comprises a video clip setting part 81, an audio clip setting part 82, and a file copy setting part 83. In both the video clip setting part 81 and the audio clip setting part 82, radio buttons can be used to make selections such as "Copy material," "Copy to one file," and "Reference original video sequence."

In the file copy setting part 83, it is possible to select "Copy video sequence being used" and "Export range used by the clip." Here, "Export range used by the clip" is selected and the margin quantity is selected in a margin setting part 84. The margin quantity is specified, for example, in a "h:m:s:frame" format. In the case of 30 frames/s video sequence, one frame is ⅓₀ s.

Next, in step S12, the CPU 102 executes an analysis process on the project. Here, the tracks contained in the project, the time position of the clip disposed in each track, information about the video sequence referred by the clip, and the like are collected.

In step S13, the CPU 102 determines whether the entirety of the video sequence referred by the clip has been exported. If it is determined that unexported video sequence exists, then the method transitions to step S14; in addition, if it is determined that unexported video sequence does not exist, then the method transitions to step S18.

In step S14, the CPU 102 selects the unexported video sequence.

In step S15, if the set margin quantity is added, the CPU 102 determines whether its range (in-out) from the start point to the end point fits in the range (in-out) of the original video sequence from the start point to the end point. If it is determined that, even if the set margin is added, it will fit in the range of the original video sequence from the start point to the end point, then the method transitions to step S16, but otherwise transitions to step S17.

In step S16, the video sequence generating unit 27 of the CPU 102 generates and exports a video sequence file of the video sequence wherein supplementary ranges, each of which has the margin quantity set in step S11, are added to the start and end, respectively, of the video sequence reference range referred by the clip so that they are temporally continuous therewith.

In step S17, the CPU 102 generates and exports a video sequence file of video sequence that is limited to the range of the original video sequence from the start point to the end point.

After step S16 and step S17 end, the method transitions to step S13, and step S13 through step S17 are repeated.

In step S18, the CPU 102 generates an editing data file by writing out the project information based on the AAF format. If a video sequence file is generated in step S16, then the editing data file contains information about the video sequence reference range referred by the clip and the supplementary ranges that are consecutively preceding to and/or subsequent to the reference range, respectively. In addition, if a video sequence file is generated in step S17, then the editing data file contains information about the video sequence reference range referred by the clip and the range of the original video sequence data from the start point to the end point. Furthermore, the editing information of each clip in the editing data file is modified so that it references the exported video sequence file.

Another Embodiment of Margin Quantity Settings

Figure 8:
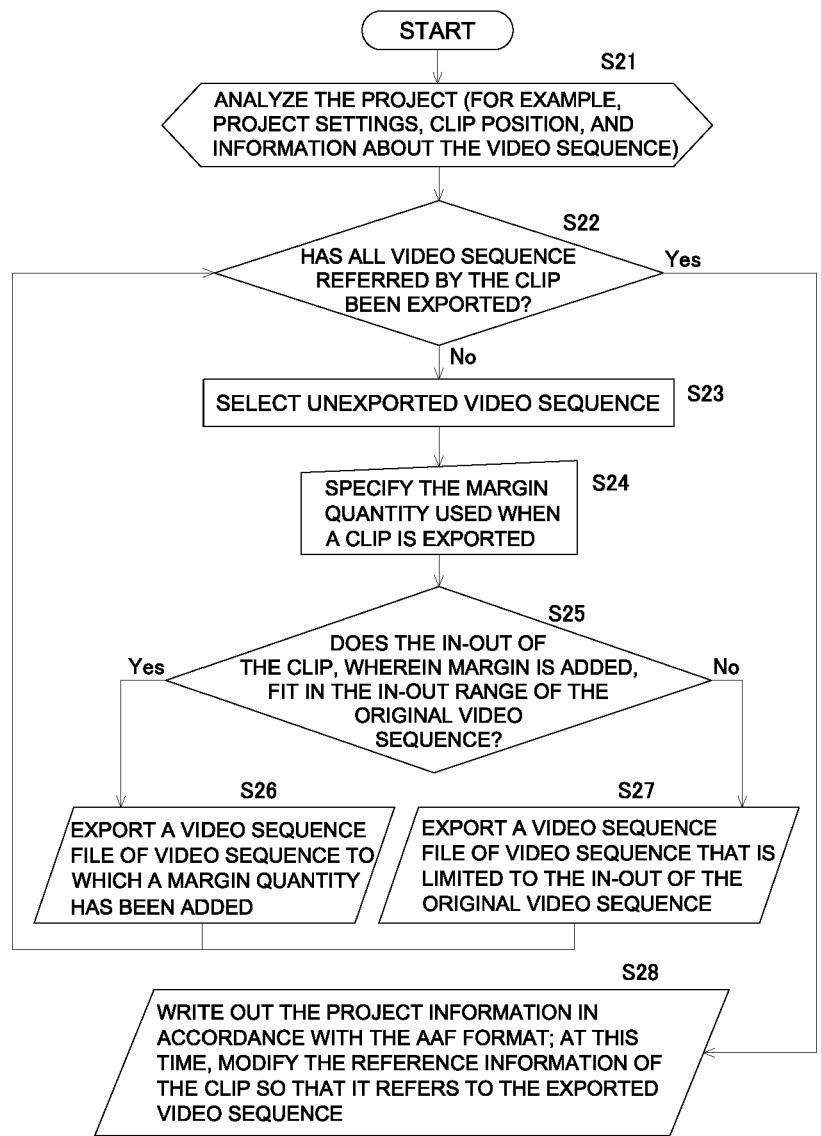
FIG. 8 is a control flow chart according to another embodiment of the present invention.

FIG. 8 is a control flow chart according to another embodiment. The following explains, based on the flow chart in FIG. 8, the case of setting the margin quantity for each clip, referencing FIG. 6 and FIG. 7 where appropriate.

Next, in step S21, if export project is selected, then the CPU 102 executes an analysis process on the project. Here, the tracks contained in the project, the time position of the clip disposed in each track, information about the video sequence referred by the clip, and the like are collected.

In step S22, the CPU 102 determines whether the entirety of the video sequence referred by the clip has been exported. If it is determined that unexported video sequence exists, then the method transitions to step S23; in addition, if it is determined that unexported video sequence does not exist, then the method transitions to step S28.

In step S23, the CPU 102 selects the unexported video sequence.

In step S24, the CPU 102 receives the specification of the margin quantity when the clip is exported. At this point, a window for specifying the margin quantity is displayed, and the CPU 102 can receive the specification of the margin quantity in the "h:m:s:frame" format, similar to that discussed above.

In step S25, if the set margin quantity is added, the CPU 102 determines whether its range (in-out) from the start point to the end point fits in the range (in-out) of the original video sequence from the start point to the end point. If it is determined that, even if the set margin is added, it will fit in the range of the original video sequence from the start point to the end point, then the method transitions to step S26, but otherwise transitions to step S27.

In step S26, the video sequence generating unit 27 of the CPU 102 adds supplementary ranges, in accordance with the margin quantity set in step S24, to the start and end, respectively, of the video sequence reference range referred by the clip so that they are temporally continuous therewith, generates a video sequence file, and exports such.

In step S27, the CPU 102 generates and exports a video sequence file that is limited to the range of the original video sequence from the start point to the end point.

After step S26 and step S17 end, the method transitions to step S22 and step S22 through step S27 are repeated.

In step S28, the CPU 102 generates an editing data file by writing out the project information based on the AAF format. If a video sequence file is generated in step S26, then the editing data file contains information about the video sequence reference range referred by the clip and the supplementary ranges that are consecutively preceding to and/or subsequent to the reference range, respectively. In addition, if a video sequence file is generated in step S27, then the editing data file contains information about the video sequence reference range referred by the clip and the range of the original video sequence from the start point to the end point. Furthermore, the editing information of each clip in the editing data file is modified so that it references the exported video sequence file.

<Importing a Project>

The following explains a case wherein a project file, i.e., a file that contains video sequence and editing data, that is output by the editing apparatus according to the present invention is imported and used by another editing apparatus (editing application). Here, an importing method will be explained for a case wherein an editing data file described in the AAF format and a video sequence file that contains video sequence, to which the abovementioned supplementary ranges are added, are read in and an editing process is further performed.

Figure 9:
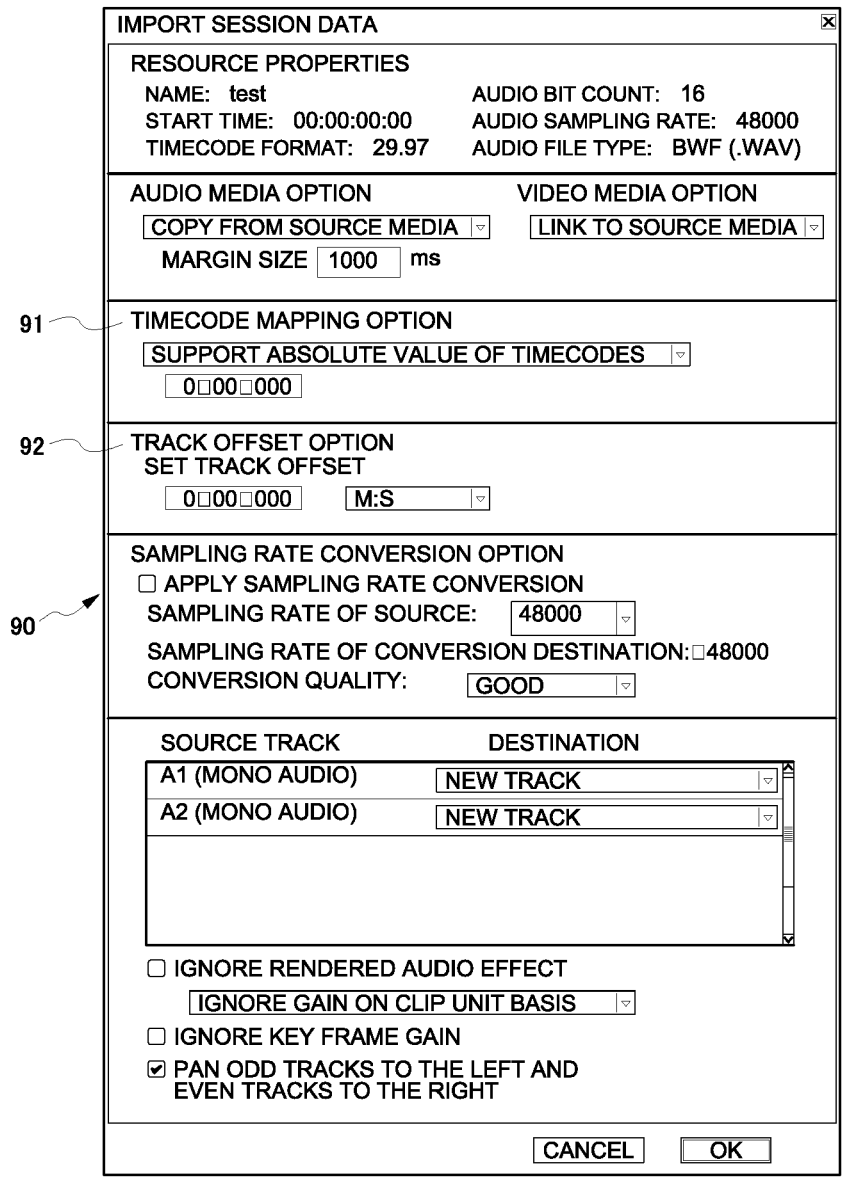
FIG. 9 is an explanatory diagram that shows one example of a settings screen when a project file is being exported by another editing apparatus.

FIG. 9 is an explanatory diagram that shows one example of a settings screen that is used when the other editing apparatus imports a project file.

Referring to FIG. 9, an import settings screen 90 is displayed on the application side where the project file is imported.

The import settings screen 90 comprises a time code mapping options setting part 91. In the time code mapping options setting part 91, it is possible to select the options of "Import taking the start point of the AAF file into consideration," "Set head of timeline to start point of AAF file and import," and "Ignore start point of AAF file and import by timecode." An editing process can be executed based on the video sequence file, wherein the supplementary ranges are contained in the reference range referred by the clip, and the editing range can be decompressed using the supplementary ranges, which makes it possible to perform the editing process with great flexibility.

<Reimporting a Project File after it has been Edited by Another Editing Apparatus>

The following explains a case wherein a video sequence file containing video sequence, to which the abovementioned supplementary ranges are added, is first exported so that it can be used by another editing apparatus (editing application), after which the video sequence file and the editing data file, which have been further edited and output by that editing apparatus, are reimported by the editing apparatus according to the present embodiment.

Figure 10:
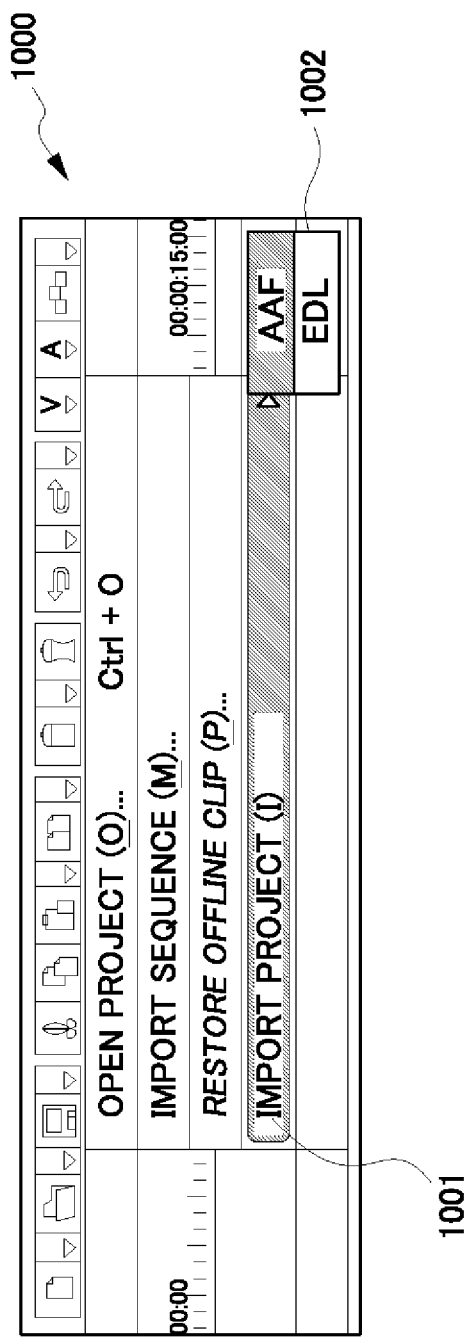
FIG. 10 is an explanatory diagram that shows one example of a menu screen when the project file, which was edited by the other editing apparatus, is reimported.

FIG. 10 is an explanatory diagram that shows one example of a menu screen that is used when a project that was edited by the other editing apparatus is reimported by the editing apparatus according to the present embodiment. This figure shows one example of a project import menu screen.

Referring to FIG. 10, a project import menu screen 1000 comprises menu bars, such as "Open project," "Import sequence," "Restore offline clip," and "Import project," and is configured so that an import bar 1001 of these menu bars for instructing the import of the project is selected, and so that, furthermore, a menu window 1002 for selecting the format opens.

The menu window 1002 is configured so that selection bars for selecting any one of AAF and EDL, which serve as formats, can be displayed, and so that a format can be specified.

If an import format is specified, then an import dialog is displayed for selecting the file to be imported.

Figure 11:
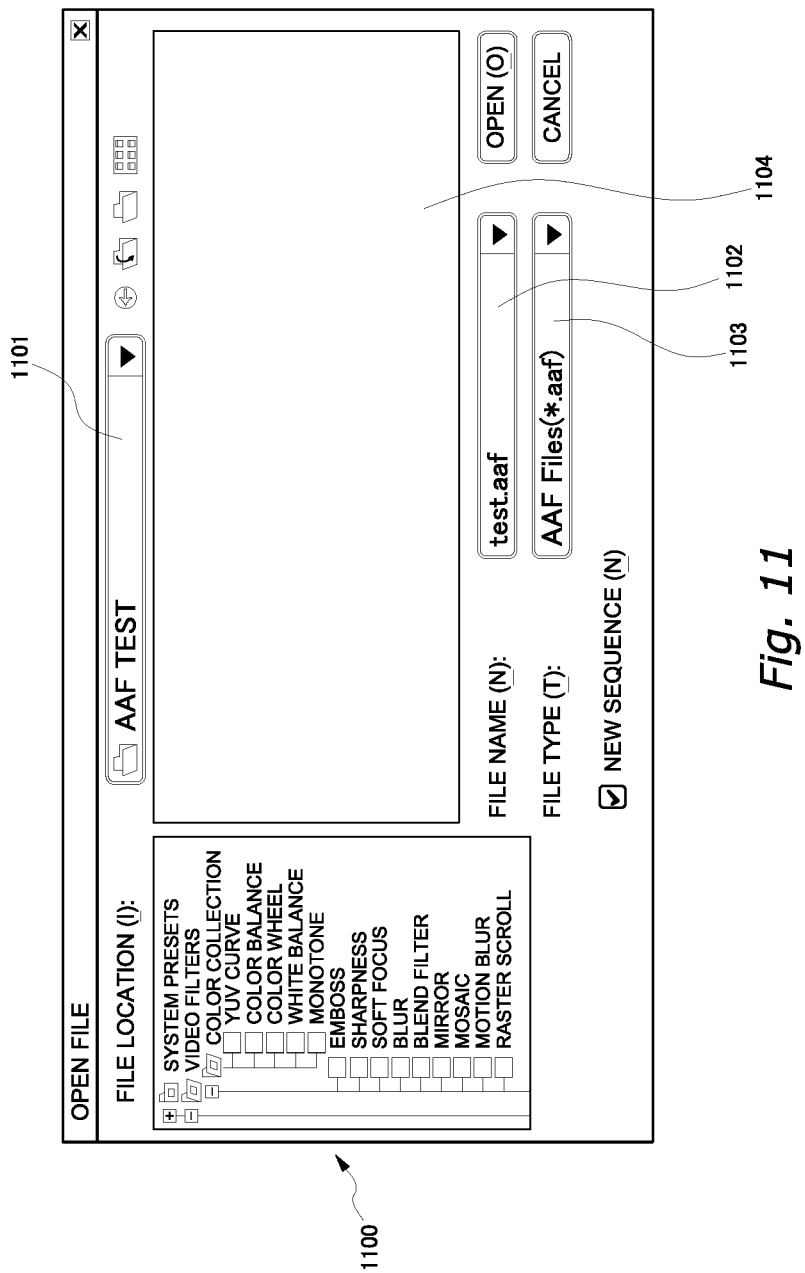
FIG. 11 is an explanatory diagram that shows one example of an import dialog screen when the project file, which was edited by the other editing apparatus, is reimported.

FIG. 11 is an explanatory diagram that shows one example of an import dialog screen that is used when a project file that has been edited by the other editing apparatus is reimported.

Referring to FIG. 11, an import dialog screen 1100 comprises: a storage location display part 1101, which indicates the storage location of the file; a file name display part 1102, which displays the file name; a file type display part 1103, which displays the file type; and a file display part 1104, which displays an icon of the file stored in the storage location that is displayed in the storage location display part 1101.

The AAF file to be imported can be imported by either clicking an icon displayed in the file display part 1104 or clicking a file name displayed in the file name display part 1102.

As shown in FIG. 4, the imported AAF file comprises, for example, content information and information about the included clips, and also comprises information for associating the video sequence referred by each clip with that clip. Accordingly, the video sequence file referred by each clip is simultaneously imported by the editing apparatus.

Similar to the process of importing at the other editing apparatus as discussed above, when the video sequence file is imported, it is possible to select options, such as "Import taking start point of AAF file into consideration," "Set head of timeline to start point of AAF file and import," and "Ignore start point of AAF file and import by timecode."

At this point, if "Import taking start point of AAF file into consideration" is selected, then the video sequence file edited by the other editing apparatus is disposed using information about: the video sequence reference ranges referred by the source clips contained in the AAF file and that are set when exporting; and the supplementary ranges that are temporally continuous with the start and end of the reference range. Thereby, the clips of the video sequence file that was edited by the other editing apparatus can be disposed so that the time axis is not shifted, even if they replace the pre-export clips.

In so doing, the video sequence file exported from the editing apparatus is further edited by the other editing apparatus, and it is then possible to reimport and edit such. At this time, it is possible to reduce the data quantity because a video sequence file is generated that cuts out the vicinity of the range referred by the clip without using the original video sequence.

In addition, an editing process that cannot be performed by one editing apparatus is performed by the other editing apparatus; furthermore, if the latter returns its editing information to the editing apparatus, then it is possible to expand the scope of editing. At this time, including supplementary ranges that are temporally continuous with the start and end, respectively, of the reference range referred by the clip makes it possible to expand the scope of editing applications such as trimming, and thereby to perform a variety of editing functions.

<Video Sequence File to be Exported>

Figure 12:
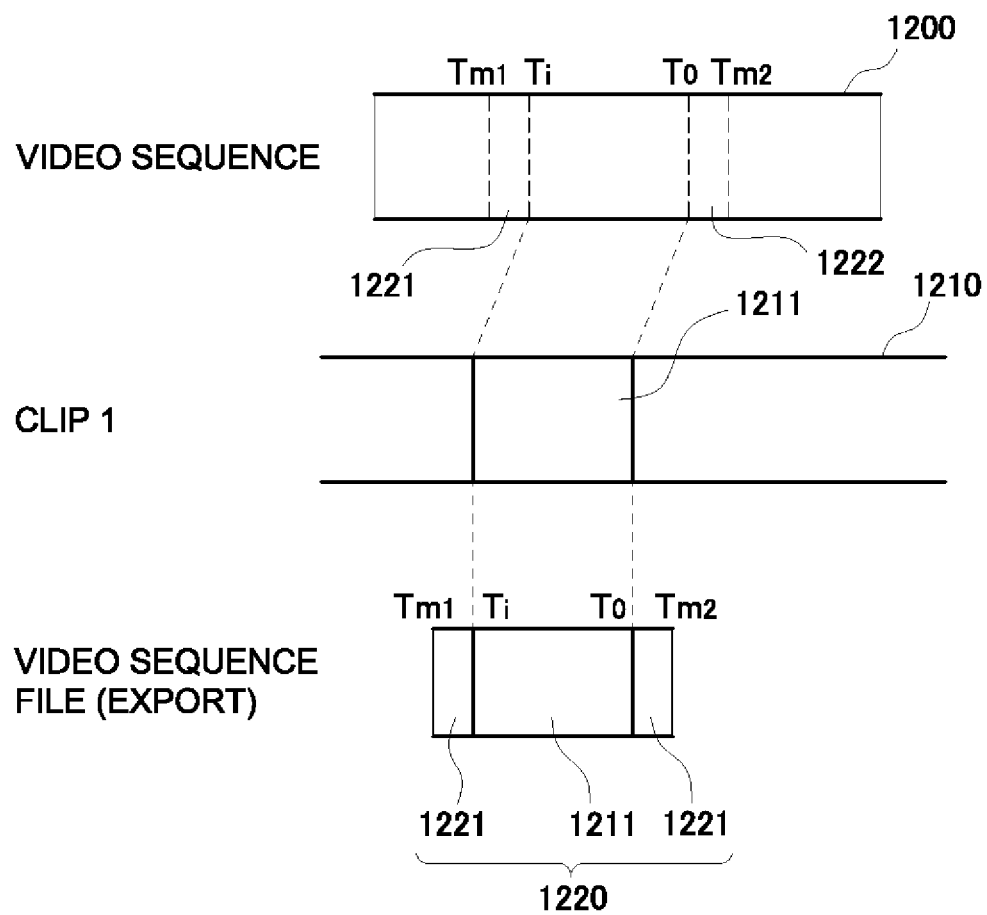
FIG. 12 is an explanatory diagram of the generation of a video sequence file to be exported.

FIG. 12 is an explanatory diagram of the generation of a video sequence file to be exported.

A clip 1211, which is disposed on a track 1210 shown in the middle part of FIG. 12, references one part (start point Ti to end point To) of original video sequence 1200 shown in the upper part of FIG. 12. In such a case, the video sequence file to be exported contains the video sequence file 1211 from the start point Ti to the end point To, and video sequence 1221, 1222 that are positioned before and after the video sequence file 1211, respectively, each of which has a specified margin quantity.

These supplementary ranges 1221, 1222 are cut from the original video sequence 1200 from a start point Tm1 to an end point Tm2, which contains the margin portions.

If multiple clips reference the same video sequence and the end point of a reference range referred by one clip is behind the start point of a reference range referred by another clip, i.e., in a case wherein reference ranges overlap, then an editing apparatus (editing application), such as one that performs destructive editing (wherein the video sequence file referred by the clips is directly edited and its video sequence are thereby updated), cannot reference them simultaneously.

Figure 13:
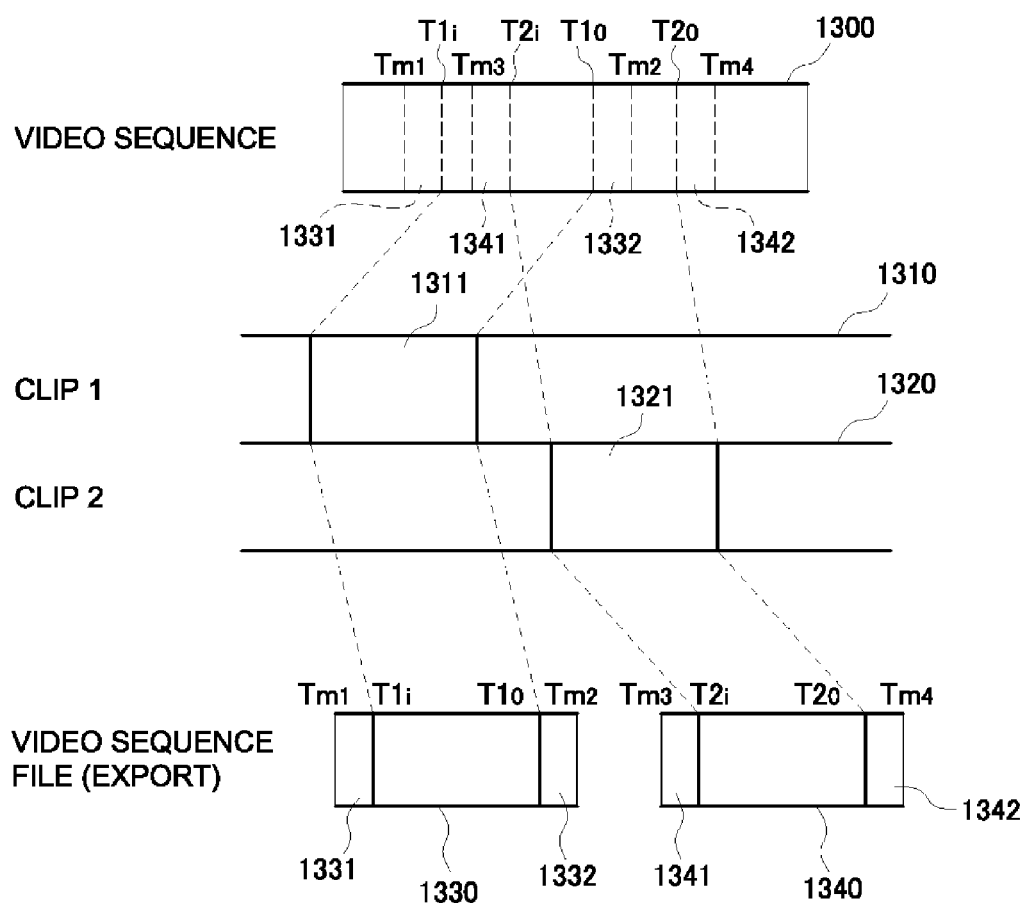
FIG. 13 is an explanatory diagram of another example of the generation of a video sequence file to be exported.

FIG. 13 is an explanatory diagram of another example of the generation of a video sequence file to be exported.

Referring to FIG. 13, this example is configured so that video sequence files are generated to which supplementary ranges, each of which has a prescribed margin quantity, are added to video sequence reference ranges referred by each clip.

In the example shown in FIG. 13, the reference range that is referred by a first clip 1311, which is disposed in a first track 1310, extends from a start point T1i to an end point T1o, and the reference range that is referred by a second clip 1321, which is disposed in a second track 1320, extends from a start point T2i to an end point T2o.

In this case, a first video sequence file 1330 (start point Tm1 to end point Tm2), wherein supplementary ranges 1331, 1332 of prescribed margin portions are added to the reference range that is referred by the first clip 1311, and a second video sequence file 1340 (start point Tm3 to end point Tm4), wherein supplementary ranges 1341, 1342 of prescribed margin portions are added to the reference range that is referred by the second clip 1321, are output as the video sequence files to be exported.

Here, an example is shown wherein the first clip 1311 is disposed in the track 1310 and the second clip 1321 is disposed in the track 1320, but the present invention is not limited to such a case, and the first clip 1311 and the second clip 1321 may be disposed in the same track, or they may be disposed so that their clips overlap on the time axis.

In the same manner as discussed above, in a case wherein multiple clips reference the same video sequence and the end point of a reference range referred by one clip is behind the start point of a reference range referred by another clip, i.e., if the reference ranges overlap, then it is also possible to cut a single video sequence file from the start point of the reference range of one clip to the end point of the reference range of the other clip. As discussed above, in the case of an editing apparatus that performs destructive editing so that a video sequence file referred by a clip is directly edited and its video sequence are thereby updated, it is not possible to construct a single video sequence file in the above manner, but it is possible to reduce the data quantity if the editing apparatus (editing application) is one that performs a non-destructive editing process.

Figure 14:
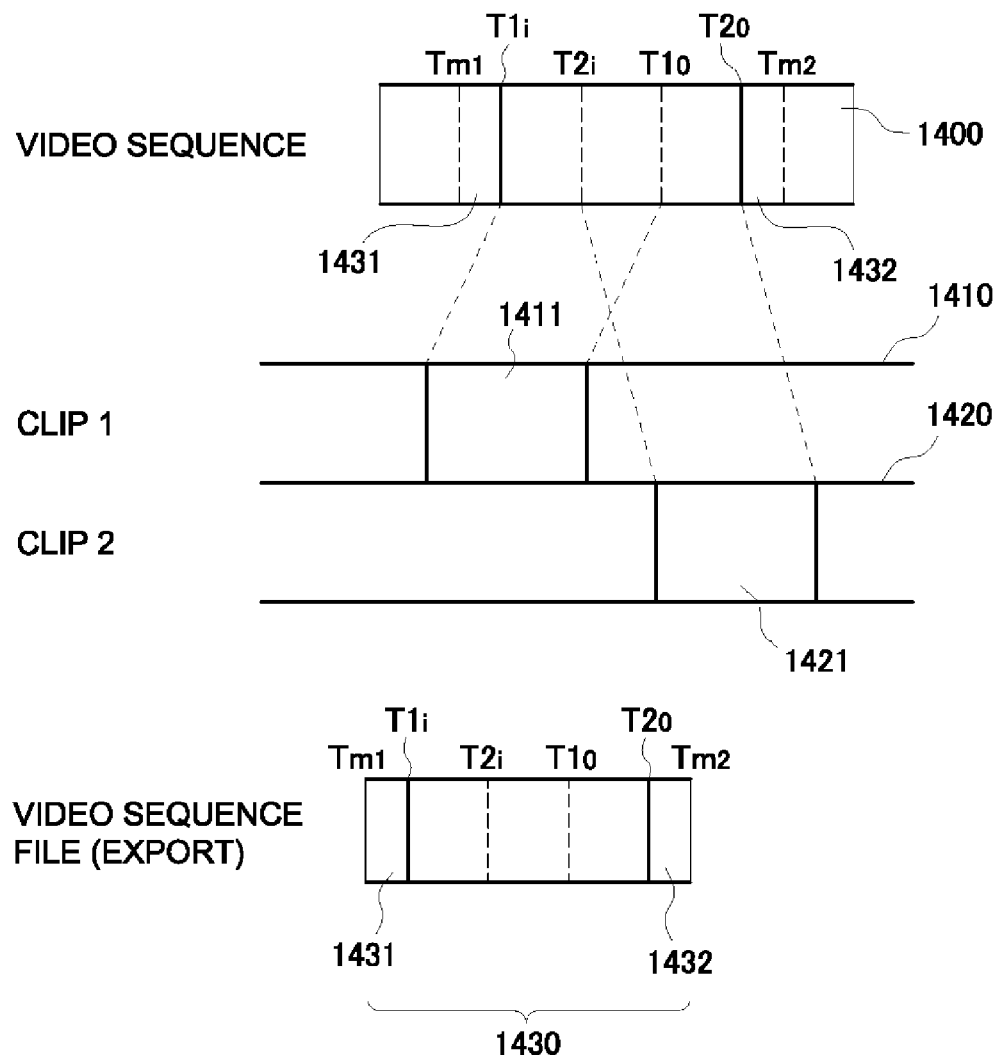
FIG. 14 is an explanatory diagram of yet another example of the generation of a video sequence file to be exported.

FIG. 14 is an explanatory diagram of yet another example of the generation of a video sequence file to be exported.

Referring to FIG. 14, consider a case wherein, for example, a reference range that is referred by a first clip 1411, which is disposed on a first track 1410, extends from a start point T1i to an end point T1o, and a reference range that is referred by a second clip 1421, which is disposed in a second track 1420, extends from a start point T2i to an end point T2o.

In this case, the video sequence file to be exported contains video sequence 1430 (start point Tm1 to end point Tm2) that comprise video sequence from the start point T1*i* of the reference range of the first clip 1411 to the end point T2*o* of the reference range of the second clip 1421 and the video sequence of supplementary ranges 1431, 1432 that have prescribed margin portions.

As discussed above, it is not possible to specify a supplementary range that extends beyond the original video sequence range from the start point to the end point (in-out), and therefore the original video sequence range from the start point to the end point is limited if the margin quantity is large.

In addition, a configuration is possible wherein a supplementary range is only added before the start point of the clip or after the end point thereof.

Other Embodiments

A computer program that causes a computer to execute the methods discussed above and a computer readable storage medium whereon that program is recorded are included in the scope of the present invention. Here, a computer readable storage medium includes, for example, a flexible disk, a hard disk, a CD-ROM, an MO, a DVD, DVD-ROM, DVD-RAM, a BD (Blu-ray disc), and semiconductor memory.

The computer program is not limited to one that is recorded in the storage medium, and may be transmitted via, for example, a network such as an electric communication circuit, a wireless or wired communication circuit, or the Internet.

INDUSTRIAL APPLICABILITY

The present invention can be adapted to an editing apparatus for editing, for example, moving picture data and audio data.

The invention claimed is:

1. An editing apparatus for exporting a project file to an editing application for editing material data of an original video or audio sequence, the apparatus comprising:
   an editing unit configured to automatically set a reference range for a video sequence that corresponds to a clip of the material data identified by a user to be exported to the editing application;
   a file generating unit configured to automatically select, based on the set reference range, the material data of the original video or audio sequence to generate the video sequence that corresponds to the identified clip;
   a margin setting unit configured to automatically set a margin quantity for supplemental material data of the original video or audio sequence, the margin quantity having a time duration specified by a user of the editing apparatus;
   a margin addition unit configured to automatically generate a supplemental range of the supplemental material data based on the margin quantity, determine whether the supplemental range is within an original range of the original video or audio sequence, and add the supplemental material data to the selected material data when the supplemental range is within the original range, the added supplemental material data either consecutively preceding or following the selected material data;
   a video sequence file generator configured to automatically create a video sequence file that includes the selected material data of the original video sequence and the added supplemental material data;
   an editing data file generating unit configured to automatically generate an editing data file including editing information about the video sequence file, the editing information comprising position and length information about the generated video sequence set by the reference range and information associating the generated video sequence and the supplemental material data with the original video or audio sequence;
   a project file generator configured to automatically generate a project file that includes the video sequence file and the editing data file; and
   an output configured to automatically export the project file to the editing application for editing the original video sequence and the supplemental material data.

2. An editing apparatus according to claim 1, wherein the editing information corresponding to each range in the editing data file is modified to reference the video sequence file.

3. The editing apparatus according to claim 1, wherein the video sequence file generator is configured to generate two video sequence files including, a first video sequence file comprising material data corresponding to the reference range and the supplemental reference range, and a second video sequence file comprising material data corresponding to an additional reference range set by the editing unit and an additional supplemental range generated by the margin addition unit, and
   wherein the supplemental reference range is consecutively preceding to and/or subsequent to the reference range and the additional supplemental reference range is consecutively preceding to and/or subsequent to the additional reference range.

4. The editing apparatus of claim 1, further comprising:
   an input for importing the video sequence file in a first edited state from the at least one other editing unit,
   wherein the material data is edited by at least one selected from a group consisting of the editing unit and the at least one other editing unit, using at least one of the exported video sequence file and the imported video sequence file.

5. The apparatus of claim 4, wherein the editing unit is further configured to:
   further edit the imported video sequence file.

6. The apparatus of claim 5, wherein the editing unit is further configured to:
   repeat exporting and importing of the video sequence file to further edit the video sequence file, wherein the editing unit or the at least one other editing unit edits the material data based on at least one of the edits to the video sequence file.

7. An editing apparatus according to claim 1, further comprising:
   an input configured to import an edited video sequence file and a modified editing data file, the edited video sequence file being created by editing the exported video sequence file by the editing application, wherein the video sequence of the edited video sequence file is associated with the original video sequence by the modified editing data file.

8. An editing method for exporting a project file to an editing application for editing material data of an original video or audio sequence, the method comprising:

setting, by a computer processor, a reference range for a video sequence that corresponds to a clip of the material data identified by a user to be exported to the editing application;

selecting, by the computer processor and based on the set reference range, the material data of the original video or audio sequence to generate the video sequence that corresponds to the identified clip;

setting, by the computer processor, a margin quantity for supplemental material data of the original video or audio sequence, the margin quantity having a time duration specified by a user of the editing apparatus;

generating, by the computer processor, a supplemental range of the supplemental material data based on the margin quantity;

determining, by the computer processor, whether the supplemental range is within an original range of the original video or audio sequence;

adding, by the computer processor, the supplemental material data to the selected material data when the supplemental range is within the original range, the added supplemental material data either consecutively preceding or following the selected material data;

creating, by the computer processor, a video sequence file that includes the selected material data of the original video sequence and the added supplemental material data;

generating, by the computer processor, an editing data file including editing information about the video sequence file, the editing information comprising position and length information about the generated video sequence set by the reference range and information associating the generated video sequence and the supplemental material data with the original video or audio sequence;

generating, by the computer processor, a project file that includes the video sequence file and the editing data file; and exporting, by the computer processor, the project file to the editing application for editing the original video sequence and the supplemental material data.

9. An editing method according to claim 8, wherein editing information corresponding to each range in the editing data file is modified to reference the video sequence file.

10. The editing method according to claim 8, further comprising:

generating two video sequence files including, a first video sequence file comprising material data corresponding to the reference range and the supplemental reference range, and a second video sequence file comprising material data corresponding to an additional reference range set by the editing unit and an additional supplemental range generated by the margin addition unit, and wherein the supplemental reference range is consecutively preceding to and/or subsequent to the reference range and the additional supplemental reference range is consecutively preceding to and/or subsequent to the additional reference range.

11. The method of claim 8, further comprising:
importing the video sequence file in a first edited state from the at least one other editing unit,
wherein the material data is edited by at least one selected from a group consisting of the editing unit and the at least one other editing unit, using at least one of the exported video sequence file and the imported video sequence file.

12. The method of claim 8, further comprising:
importing an edited video sequence file and a modified editing data file, the edited video sequence file being created by editing the exported video sequence file by the editing application, wherein the video sequence of the edited video sequence file is associated with the original video sequence by the modified editing data file.

13. A non-transitory computer-readable medium having recorded thereon instructions for causing a computer to perform an editing operation for exporting a project file to an editing application for editing material data of an original video or audio sequence, wherein the instructions, when executed, perform the steps of:

setting, by the computer, a reference range for a video sequence that corresponds to a clip of the material data identified by a user to be exported to the editing application;

selecting, by the computer and based on the set reference range, the material data of the original video or audio sequence to generate the video sequence that corresponds to the identified clip;

setting, by the computer, a margin quantity for supplemental material data of the original video or audio sequence, the margin quantity having a time duration specified by a user of the editing apparatus;

generating, by the computer, a supplemental range of the supplemental material data based on the margin quantity;

determining, by the computer, whether the supplemental range is within an original range of the original video or audio sequence;

adding, by the computer, the supplemental material data to the selected material data when the supplemental range is within the original range, the added supplemental material data either consecutively preceding or following the selected material data;

creating, by the computer, a video sequence file that includes the selected material data of the original video sequence and the added supplemental material data;

generating, by the computer, an editing data file including editing information about the video sequence file, the editing information comprising position and length information about the generated video sequence set by the reference range and information associating the generated video sequence and the supplemental material data with the original video or audio sequence;

generating, by the computer, a project file that includes the video sequence file and the editing data file; and exporting, by the computer, the project file to the editing application for editing the original video sequence and the supplemental material data.

14. The computer readable medium according to claim 13, wherein the editing method further comprises:
receiving an instruction related to the length of the additional reference range.

15. The computer readable medium according to claim 13, wherein the instructions, when executed, further perform the steps of:

generating two video sequence files including, a first video sequence file comprising material data corresponding to the reference range and the supplemental reference range, and a second video sequence file comprising material data corresponding to an additional reference range set by the editing unit and an additional supplemental range generated by the margin addition unit, and wherein the supplemental reference range is consecutively preceding to and/or subsequent to the reference range and the additional supplemental reference range is consecutively preceding to and/or subsequent to the additional reference range.

16. An editing apparatus for generating and exporting an editable video sequence configured to be trimmed by a video editing application, the apparatus comprising:
   a reference range generator configured to automatically set a reference range that corresponds to a clip of original material data to be edited by the video editing application;
   a video sequence generator configured to automatically select a video sequence from the original material data based on the set reference range that corresponds to the identified clip;
   a supplemental range generator that receives a margin quantity and automatically generates a supplemental range of the original material data that either consecutively precedes and/or consecutively follows the set reference range for the identified clip of the original material data;
   a supplemental content identifier that automatically accesses supplemental material data in the original material data based on the generated supplemental range of the original material data; and
   a video sequence file generator that automatically generates a video sequence file comprising the editable video sequence by combining the accessed supplemental material data and the selected video sequence, wherein the editable video sequence is configured to be edited by the video editing application by trimming at least a portion of the supplemental material data.

17. The editing apparatus of claim 16, further comprising an output configured to export the project file to the editing application.

18. The editing apparatus of claim 16, wherein the reference range generator is configured to automatically set the reference range for the clip of the original material data based on a user input by a user of the editing apparatus.

19. The editing apparatus of claim 16, wherein the supplemental range generator automatically generates the supplemental range based on the margin quantity having a duration that is specified based on a user input by a user of the editing apparatus.

20. The editing apparatus of claim 16, further comprising an editing data file generator that automatically generates an editing data file that includes editing information relating to the selected video sequence, including position and length information about the selected video sequence set by the set reference range and information associating the original material data, the selected video sequence and the supplemental material data.

21. The editing apparatus of claim 20, further comprising a project file generator configured to generate a project file that includes the generated video sequence file and the editing data file.

22. The editing apparatus of claim 16, wherein the video sequence file generator is configured to generate a single video sequence file when the video editing application is configured to perform nondestructive editing, and to generate a pair of video sequence files when the video editing application is configured to perform destructive editing.

23. The editing apparatus of claim 16, wherein the supplemental range generator automatically generates a pair of supplemental ranges of the original material data that consecutively precede and consecutively follow, respectively, the set reference range for the identified clip of the original material data.

24. An editing apparatus for generating and exporting an editable video sequence configured to be trimmed by a video editing application, the apparatus comprising:
   a reference range generator configured to automatically set a reference range that corresponds to a clip of original material data to be edited by the video editing application;
   a video sequence generator configured to automatically select a video sequence from the original material data based on the set reference range that corresponds to the identified clip;
   a supplemental range generator that receives a margin quantity and automatically generates a supplemental range of the original material data that either consecutively precedes and/or consecutively follows the set reference range for the identified clip of the original material data;
   a supplemental content identifier that automatically accesses supplemental material data in the original material data based on the generated supplemental range of the original material data; and
   a video sequence file generator that, when the video editing application is configured to perform nondestructive editing, automatically generates a single video sequence file comprising the editable video sequence by combining the accessed supplemental material data and the selected video sequence, wherein the editable video sequence is configured to be edited by the video editing application by trimming at least a portion of the supplemental material data,
   wherein, when the video editing application is configured to perform destructive editing, the video sequence file generator generates a pair of video sequence files each comprising the editable video sequence by combining the accessed supplemental material data and the selected video sequence.

25. The editing apparatus of claim 24, further comprising an output configured to export the project file to the editing application.

26. The editing apparatus of claim 24, further comprising an editing data file generator that automatically generates an editing data file that includes editing information relating to the selected video sequence, including position and length information about the selected video sequence set by the set reference range and information associating the original material data, the selected video sequence and the supplemental material data.

27. The editing apparatus of claim 24, wherein the video editing application performs destructive editing of one of the pair of video sequence files by directly editing and updating the video sequence file, and the video editing application performs non-destructive editing of the single video sequence file when the video sequence file is not directly edited and updated by the video editing application.

28. The editing apparatus of claim 24, wherein the reference range generator is configured to automatically set the reference range for the clip of the original material data based on a user input by a user of the editing apparatus.

29. The editing apparatus of claim 24, wherein the supplemental range generator automatically generates the supplemental range based on the margin quantity having a duration that is specified based on a user input by a user of the editing apparatus.

30. The editing apparatus of claim 26, further comprising a project file generator configured to generate a project file that includes the generated video sequence file and the editing data file.

31. The editing apparatus of claim 24, wherein the supplemental range generator automatically generates a pair of supplemental ranges of the original material data that consecutively precede and consecutively follow, respectively, the set reference range for the identified clip of the original material data.

32. An editing apparatus for generating and exporting an editable video sequence configured to be trimmed by a video editing application, the apparatus comprising:
- a reference range generator configured to automatically set a reference range that corresponds to a clip of original material data to be edited by the video editing application;
- a video sequence generator configured to automatically select a video sequence from the original material data based on the set reference range that corresponds to the identified clip;
- a supplemental range generator that receives a margin quantity and automatically generates a supplemental range of the original material data that either consecutively precedes and/or consecutively follows the set reference range for the identified clip of the original material data;
- a supplemental content identifier that automatically accesses supplemental material data in the original material data based on the generated supplemental range of the original material data; and
- a video sequence file generator that automatically generates a video sequence file comprising the editable video sequence by combining the accessed supplemental material data and the selected video sequence, wherein the editable video sequence is configured to be edited by the video editing application by trimming at least a portion of the supplemental material data,
- wherein the reference range generator is configured to automatically set, in response to a request of a user of the editing apparatus, a first reference range that corresponds to a first clip of original material data and a second reference range that corresponds to a second clip of original material data, wherein the second reference range is subsequent to the first reference range,
- wherein the video sequence generator automatically selects first and second video sequences from the original material data based on the set first and second reference ranges that corresponds to the identified first and second clips,
- wherein the supplemental range generator is further configured to automatically generate respective first and second supplemental ranges for each of the first and second reference ranges that consecutively precede and consecutively follow, respectively, the first and second reference ranges for the identified first and second clips of the original material data,
- wherein the supplemental content identifier automatically accesses supplemental material data in the original material data based on the generated first and second supplemental ranges of the original material data, and
- wherein the video sequence file generator automatically generates a video sequence file comprising the editable video sequence by combining the accessed supplemental material data and the selected first and second video sequences, wherein the editable video sequence is configured to be edited by the video editing application by trimming at least a portion of the supplemental material data.

33. The editing apparatus of claim 32, further comprising an output configured to export the project file to the editing application.

34. The editing apparatus of claim 32, wherein the reference range generator is configured to automatically set the reference range for the clip of the original material data based on a user input by a user of the editing apparatus.

35. The editing apparatus of claim 32, wherein the supplemental range generator automatically generates the supplemental range based on the margin quantity having a duration that is specified based on a user input by a user of the editing apparatus.

36. The editing apparatus of claim 32, further comprising an editing data file generator that automatically generates an editing data file that includes editing information relating to the selected video sequence, including position and length information about the selected video sequence set by the set reference range and information associating the original material data, the selected video sequence and the supplemental material data.

37. The editing apparatus of claim 36, further comprising a project file generator configured to generate a project file that includes the generated video sequence file and the editing data file.

38. The editing apparatus of claim 32, wherein the video sequence file generator is configured to generate a single video sequence file when the video editing application is configured to perform nondestructive editing, and to generate a pair of video sequence files when the video editing application is configured to perform destructive editing.

39. The editing apparatus of claim 38, wherein the video editing application performs destructive editing of one of the pair of video sequence files by directly editing and updating the video sequence file, and the video editing application performs non-destructive editing of the single video sequence file when the video sequence file is not directly edited and updated by the video editing application.

40. The editing apparatus of claim 32, wherein the supplemental range generator automatically generates a pair of supplemental ranges of the original material data that consecutively precede and consecutively follow, respectively, the set reference range for the identified clip of the original material data.

* * * * *